(12) United States Patent
Lambert et al.

(10) Patent No.: US 9,769,653 B1
(45) Date of Patent: *Sep. 19, 2017

(54) EFFICIENT KEY ESTABLISHMENT FOR WIRELESS NETWORKS

(71) Applicant: Marvell International Ltd., Hamilton (BM)

(72) Inventors: Paul A. Lambert, Mountain View, CA (US); Frank Huang, Pleasanton, CA (US)

(73) Assignee: Marvell International Ltd., Hamilton (BM)

( * ) Notice: Subject to any disclaimer, the term of this patent is extended or adjusted under 35 U.S.C. 154(b) by 309 days.

This patent is subject to a terminal disclaimer.

(21) Appl. No.: 13/958,101

(22) Filed: Aug. 2, 2013

Related U.S. Application Data

(63) Continuation of application No. 12/541,731, filed on Aug. 14, 2009, now Pat. No. 8,510,560.

(60) Provisional application No. 61/090,376, filed on Aug. 20, 2008, provisional application No. 61/090,380, filed on Aug. 20, 2008.

(51) Int. Cl.
*H04L 9/00* (2006.01)
*H04W 12/04* (2009.01)
*H04L 29/06* (2006.01)

(52) U.S. Cl.
CPC .......... *H04W 12/04* (2013.01); *H04L 63/061* (2013.01)

(58) Field of Classification Search
CPC . H04L 2209/80; H04L 9/0844; H04L 9/0891; H04L 9/0838; H04L 9/083; G06Q 20/3674

USPC ........ 713/168, 170, 171; 380/44, 277; 726/4
See application file for complete search history.

(56) References Cited

U.S. PATENT DOCUMENTS

| | | |
|---|---|---|
| 5,390,165 A | 2/1995 | Tuch |
| 5,467,398 A | 11/1995 | Pierce et al. |
| 5,469,506 A | 11/1995 | Berson et al. |
| 5,479,514 A | 12/1995 | Klonowski |
| 5,481,733 A | 1/1996 | Douglis et al. |
| 5,617,118 A | 4/1997 | Thompson |
| 5,673,416 A | 9/1997 | Chee et al. |
| 5,771,356 A | 6/1998 | Leger et al. |
| 5,828,835 A | 10/1998 | Isfeld et al. |
| 5,884,099 A | 3/1999 | Klingelhofer |
| 5,991,519 A | 11/1999 | Benhammou et al. |
| 6,006,018 A | 12/1999 | Burnett et al. |
| 6,014,722 A | 1/2000 | Rudin et al. |
| 6,058,188 A | 5/2000 | Chandersekaran et al. |
| 6,092,108 A | 7/2000 | DiPlacido et al. |

(Continued)

FOREIGN PATENT DOCUMENTS

| | | |
|---|---|---|
| CN | 1140272 | 1/1997 |
| CN | 102272734 | 9/2014 |

(Continued)

OTHER PUBLICATIONS

"EP Intent to Grant", European Patent Application No. 09803951.4, May 14, 2013, 13 Pages.

(Continued)

*Primary Examiner* — Baotran N To

(57) ABSTRACT

A method and apparatus for deriving an encryption key for use between two stations in a wireless network using information intrinsic to one of the stations, without exchanging pairwise transient keys.

20 Claims, 7 Drawing Sheets

(56) References Cited

U.S. PATENT DOCUMENTS

| | | |
|---|---|---|
| 6,145,069 A | 11/2000 | Dye |
| 6,167,514 A | 12/2000 | Matsui et al. |
| 6,216,230 B1 | 4/2001 | Rallis et al. |
| 6,230,277 B1 | 5/2001 | Nakaoka et al. |
| 6,330,626 B1 | 12/2001 | Dennin et al. |
| 6,389,538 B1 | 5/2002 | Gruse et al. |
| 6,463,509 B1 | 10/2002 | Teoman et al. |
| 6,473,861 B1 | 10/2002 | Stokes |
| 6,564,318 B1 | 5/2003 | Gharda et al. |
| 6,601,167 B1 | 7/2003 | Gibson et al. |
| 6,614,985 B1 | 9/2003 | Tokunaka et al. |
| 6,704,872 B1 | 3/2004 | Okada |
| 6,711,447 B1 | 3/2004 | Saeed |
| 6,756,988 B1 | 6/2004 | Wang et al. |
| 6,799,271 B2 | 9/2004 | Kugai |
| 6,823,472 B1 | 11/2004 | DeKoning et al. |
| 6,832,280 B2 | 12/2004 | Malik et al. |
| 6,901,298 B1 | 5/2005 | Govindaraj et al. |
| 7,010,808 B1 | 3/2006 | Leung et al. |
| 7,035,827 B2 | 4/2006 | Ezaki |
| 7,036,018 B2 | 4/2006 | Horvat et al. |
| 7,069,439 B1 | 6/2006 | Chen et al. |
| 7,089,419 B2 | 8/2006 | Foster et al. |
| 7,103,788 B1 | 9/2006 | Souza et al. |
| 7,117,352 B1 | 10/2006 | Giles et al. |
| 7,126,913 B1 | 10/2006 | Patel et al. |
| 7,194,638 B1 | 3/2007 | Larky |
| 7,206,940 B2 | 4/2007 | Evans et al. |
| 7,210,038 B2 | 4/2007 | Walmsley |
| 7,266,842 B2 | 9/2007 | Foster et al. |
| 7,299,365 B2 | 11/2007 | Evans |
| 7,308,591 B2 | 12/2007 | Dubinsky |
| 7,333,464 B2 | 2/2008 | Yang et al. |
| 7,356,707 B2 | 4/2008 | Foster et al. |
| 7,370,349 B2 | 5/2008 | Holvey et al. |
| 7,373,506 B2 | 5/2008 | Asano et al. |
| 7,376,976 B2 | 5/2008 | Fierstein et al. |
| 7,496,952 B2 | 2/2009 | Edwards et al. |
| 7,499,548 B2 | 3/2009 | Meandzija et al. |
| 7,511,636 B2 | 3/2009 | Takahashi |
| 7,516,325 B2 | 4/2009 | Willey |
| 7,522,726 B2 | 4/2009 | Ishiguro et al. |
| 7,536,558 B2 | 5/2009 | Neble et al. |
| 7,549,056 B2 | 6/2009 | Carr |
| 7,571,216 B1 | 8/2009 | McRae et al. |
| 7,596,614 B2 | 9/2009 | Saunderson et al. |
| 7,606,230 B1 | 10/2009 | Cohen et al. |
| 7,620,784 B2 | 11/2009 | Panabaker |
| 7,676,040 B2 | 3/2010 | Augenstein et al. |
| 7,725,738 B1 | 5/2010 | Langhammer et al. |
| 7,743,260 B2 | 6/2010 | Fetik |
| 7,774,635 B2 | 8/2010 | Shiota |
| 7,788,670 B2 | 8/2010 | Bodas et al. |
| 7,818,389 B1 | 10/2010 | Chiang et al. |
| 7,835,725 B2 | 11/2010 | Suzuki et al. |
| 7,865,733 B2 | 1/2011 | Goto et al. |
| 7,873,841 B2 | 1/2011 | Mullis, II et al. |
| 7,898,857 B2 | 3/2011 | Kirsch et al. |
| 7,900,060 B2 | 3/2011 | Hodzic |
| 7,916,594 B2 | 3/2011 | Yang |
| 7,991,943 B2 | 8/2011 | Berenbaum et al. |
| 7,995,596 B2 | 8/2011 | Kuila et al. |
| 8,000,284 B2 | 8/2011 | Lott et al. |
| 8,001,592 B2 | 8/2011 | Hatakeyama |
| 8,094,822 B2 | 1/2012 | Suzuki |
| 8,095,816 B1 | 1/2012 | Chan |
| 8,117,478 B2 | 2/2012 | Liu et al. |
| 8,139,521 B2 | 3/2012 | Mukherjee et al. |
| 8,166,309 B2 | 4/2012 | Muralidharan et al. |
| 8,171,309 B1 | 5/2012 | Poo |
| 8,296,555 B2 | 10/2012 | Chu |
| 8,321,706 B2 | 11/2012 | Zhang |
| 8,327,056 B1 | 12/2012 | Chan |
| 8,418,242 B2 | 4/2013 | Zhang et al. |
| 8,423,789 B1 | 4/2013 | Poo et al. |
| 8,443,187 B1 | 5/2013 | Orr |
| 8,443,211 B2 | 5/2013 | Zhao et al. |
| 8,483,718 B2 | 7/2013 | Hwang |
| 8,510,560 B1 | 8/2013 | Lambert et al. |
| 8,645,716 B1 | 2/2014 | Dujari et al. |
| 8,688,968 B2 | 4/2014 | Chu et al. |
| 8,694,782 B2 | 4/2014 | Lambert |
| 8,839,016 B2 | 9/2014 | Zhang et al. |
| 8,843,686 B1 | 9/2014 | Chan et al. |
| 9,009,778 B2 | 4/2015 | Pearce et al. |
| 9,220,012 B1 | 12/2015 | Inamdar |
| 9,253,175 B1 | 2/2016 | Orr |
| 9,363,249 B2 | 6/2016 | Lambert et al. |
| 9,398,455 B2 | 7/2016 | Lambert |
| 9,402,270 B2 | 7/2016 | Lambert |
| 9,652,249 B1 | 5/2017 | Chu et al. |
| 2002/0065834 A1 | 5/2002 | Wiggen et al. |
| 2002/0069354 A1 | 6/2002 | Fallon et al. |
| 2002/0087816 A1 | 7/2002 | Atkinson et al. |
| 2002/0103930 A1 | 8/2002 | Kamentsky et al. |
| 2003/0014368 A1 | 1/2003 | Leurig et al. |
| 2003/0188162 A1 | 10/2003 | Candelore et al. |
| 2003/0200453 A1 | 10/2003 | Foster et al. |
| 2003/0200454 A1 | 10/2003 | Foster et al. |
| 2003/0208675 A1 | 11/2003 | Burokas et al. |
| 2003/0236991 A1 | 12/2003 | Letsinger |
| 2004/0030909 A1 | 2/2004 | Sako et al. |
| 2004/0054898 A1 | 3/2004 | Chao et al. |
| 2004/0125679 A1 | 7/2004 | Kwean |
| 2004/0158669 A1 | 8/2004 | Weng et al. |
| 2004/0158708 A1 | 8/2004 | Peyravian et al. |
| 2004/0184343 A1 | 9/2004 | Roohparvar et al. |
| 2004/0187001 A1 | 9/2004 | Bousis |
| 2004/0193875 A1 | 9/2004 | Aura |
| 2004/0257462 A1 | 12/2004 | Goris et al. |
| 2004/0264699 A1 | 12/2004 | Meandzija et al. |
| 2004/0266386 A1 | 12/2004 | Kuo |
| 2005/0015602 A1 | 1/2005 | Rees |
| 2005/0033869 A1 | 2/2005 | Cline |
| 2005/0055547 A1 | 3/2005 | Kawamura |
| 2005/0086551 A1 | 4/2005 | Wirasinghe et al. |
| 2005/0108171 A1 | 5/2005 | Bajikar et al. |
| 2005/0114686 A1 | 5/2005 | Ball et al. |
| 2005/0138365 A1 | 6/2005 | Bellipady et al. |
| 2005/0144468 A1 | 6/2005 | Northcutt et al. |
| 2005/0156925 A1 | 7/2005 | Fong et al. |
| 2005/0185596 A1 | 8/2005 | Kamentsky et al. |
| 2005/0210290 A1 | 9/2005 | Ono et al. |
| 2005/0278523 A1 | 12/2005 | Fortin et al. |
| 2006/0036897 A1 | 2/2006 | Lin et al. |
| 2006/0059372 A1 | 3/2006 | Fayar et al. |
| 2006/0072748 A1 | 4/2006 | Buer |
| 2006/0075259 A1 | 4/2006 | Bajikar et al. |
| 2006/0090084 A1 | 4/2006 | Buer |
| 2006/0104243 A1 | 5/2006 | Park |
| 2006/0117177 A1 | 6/2006 | Buer |
| 2006/0123248 A1 | 6/2006 | Porter et al. |
| 2006/0136735 A1 | 6/2006 | Plotkin et al. |
| 2006/0142906 A1 | 6/2006 | Brozovich et al. |
| 2006/0156390 A1 | 7/2006 | Baugher |
| 2006/0200670 A1 | 9/2006 | Kuffel et al. |
| 2006/0209595 A1 | 9/2006 | Newell |
| 2006/0233149 A1 | 10/2006 | Rustagi et al. |
| 2006/0253704 A1 | 11/2006 | Kempf et al. |
| 2006/0285686 A1 | 12/2006 | Van Den Heuvel et al. |
| 2007/0005824 A1 | 1/2007 | Howard |
| 2007/0011445 A1 | 1/2007 | Waltermann et al. |
| 2007/0022469 A1 | 1/2007 | Cooper et al. |
| 2007/0038866 A1 | 2/2007 | Bardsley et al. |
| 2007/0097904 A1 | 5/2007 | Mukherjee et al. |
| 2007/0098178 A1 | 5/2007 | Raikar |
| 2007/0136792 A1 | 6/2007 | Ting et al. |
| 2007/0150756 A1 | 6/2007 | Kudelski |
| 2007/0180271 A1 | 8/2007 | Hatakeyama et al. |
| 2007/0186105 A1* | 8/2007 | Bailey et al. ................. 713/168 |
| 2007/0189249 A1* | 8/2007 | Gurevich et al. ............. 370/338 |
| 2007/0220501 A1 | 9/2007 | Yanagawa et al. |
| 2007/0234028 A1 | 10/2007 | Rothman et al. |
| 2007/0242643 A1 | 10/2007 | Chandra et al. |

(56) References Cited

U.S. PATENT DOCUMENTS

| | | | |
|---|---|---|---|
| 2007/0260905 A1 | 11/2007 | Marsden et al. | |
| 2007/0277051 A1 | 11/2007 | Reece et al. | |
| 2007/0297606 A1 | 12/2007 | Tkacik et al. | |
| 2008/0016313 A1 | 1/2008 | Murotake et al. | |
| 2008/0028243 A1 | 1/2008 | Morisawa | |
| 2008/0034411 A1 | 2/2008 | Aoyama | |
| 2008/0043508 A1 | 2/2008 | Chao et al. | |
| 2008/0046732 A1* | 2/2008 | Fu et al. | 713/171 |
| 2008/0066075 A1 | 3/2008 | Nutter et al. | |
| 2008/0072311 A1 | 3/2008 | Mullick et al. | |
| 2008/0082837 A1 | 4/2008 | Mattsson | |
| 2008/0091944 A1 | 4/2008 | von Mueller et al. | |
| 2008/0104422 A1 | 5/2008 | Mullis et al. | |
| 2008/0108322 A1 | 5/2008 | Upp | |
| 2008/0120717 A1 | 5/2008 | Shakkarwar | |
| 2008/0295157 A1 | 11/2008 | Wong et al. | |
| 2008/0298289 A1 | 12/2008 | Jeyaseelan | |
| 2008/0313462 A1* | 12/2008 | Zhao et al. | 713/170 |
| 2009/0006658 A1 | 1/2009 | Gough | |
| 2009/0019250 A1 | 1/2009 | Rofougaran et al. | |
| 2009/0024846 A1 | 1/2009 | Ganesan et al. | |
| 2009/0049222 A1 | 2/2009 | Lee et al. | |
| 2009/0059841 A1 | 3/2009 | Laroia et al. | |
| 2009/0077618 A1 | 3/2009 | Pearce et al. | |
| 2009/0080389 A1 | 3/2009 | Messerges et al. | |
| 2009/0131061 A1 | 5/2009 | Palanki et al. | |
| 2009/0199031 A1 | 8/2009 | Zhang | |
| 2009/0217043 A1 | 8/2009 | Metke et al. | |
| 2009/0323972 A1 | 12/2009 | Kohno et al. | |
| 2009/0327608 A1 | 12/2009 | Eschmann et al. | |
| 2010/0023747 A1 | 1/2010 | Asnaashari et al. | |
| 2010/0039864 A1 | 2/2010 | Sarin et al. | |
| 2010/0058045 A1 | 3/2010 | Borras et al. | |
| 2010/0070751 A1 | 3/2010 | Chu | |
| 2010/0174934 A1 | 7/2010 | Zhao | |
| 2011/0039592 A1 | 2/2011 | Haddad et al. | |
| 2011/0211564 A1 | 9/2011 | Yoneyama et al. | |
| 2011/0231649 A1 | 9/2011 | Bollay et al. | |
| 2011/0231652 A1 | 9/2011 | Bollay et al. | |
| 2012/0284517 A1 | 11/2012 | Lambert | |
| 2013/0046966 A1 | 2/2013 | Chu | |
| 2013/0246792 A1 | 9/2013 | Lambert | |
| 2013/0346777 A1 | 12/2013 | Zhang | |
| 2014/0258724 A1 | 9/2014 | Lambert et al. | |
| 2015/0071438 A1 | 3/2015 | Lambert | |

FOREIGN PATENT DOCUMENTS

| | | |
|---|---|---|
| EP | 1847911 | 10/2007 |
| EP | 2493230 | 8/2012 |
| EP | 2605170 | 6/2013 |
| GB | 2407239 | 4/2005 |
| JP | 08076872 | 3/1996 |
| JP | 09044418 | 2/1997 |
| JP | 10320302 | 12/1998 |
| JP | 2002099502 | 4/2002 |
| JP | 2002215409 | 8/2002 |
| JP | 2004005254 | 1/2004 |
| JP | 2005011120 | 1/2005 |
| JP | 5565778 | 6/2014 |

OTHER PUBLICATIONS

"Extensions to Direct Link Setup (DLS) Comments", IEEE, P802.11z, Jul. 2009, pp. 1-3.
"Final Office Action", U.S. Appl. No. 12/098,254, May 18, 2011, 11 pages.
"Final Office Action", U.S. Appl. No. 12/541,731, May 31, 2012, 11 pages.
"Final Office Action", U.S. Appl. No. 12/178,268, May 25, 2011, 13 pages.
"Final Office Action", U.S. Appl. No. 12/101,668, May 10, 2012, 8 pages.
"Foreign Office Action", Chinese Application No. 200980136849.9, May 24, 2013, 20 Pages.
"Foreign Office Action", Chinese Application No. 200980153758.6, Apr. 27, 2013, 14 pages.
"Foreign Office Action", Japanese Application No. 2011-527899, Aug. 13, 2013, 2 pages.
"Foreign Office Action", European Patent Application No. 09803951.4, May 24, 2012, 3 pages.
"Foreign Office Action", Japanese Application No. 2011-527899, Nov. 6, 2012, 4 pages.
"Foreign Office Action", Japanese Application No. 2011-527899, Apr. 16, 2013, 5 pages.
"Foreign Office Action", European Patent Application No. 09803951.4, Dec. 13, 2012, 6 pages.
"Foreign Office Action", Japanese Application No. 2011-544456, Jul. 9, 2013, 6 pages.
"Foreign Office Action", Japanese Application No. 2011-544456, Jan. 29, 2013, 7 pages.
"Non-Final Office Action", U.S. Appl. No. 13/863,079, Jun. 20, 2013, 10 pages.
"Non-Final Office Action", U.S. Appl. No. 12/559,987, Nov. 9, 2011, 10 pages.
"Non-Final Office Action", U.S. Appl. No. 12/178,268, Dec. 22, 2010, 10 pages.
"Non-Final Office Action", U.S. Appl. No. 12/541,731, Sep. 4, 2012, 11 pages.
"Non-Final Office Action", U.S. Appl. No. 13/657,511, Mar. 28, 2013, 13 pages.
"Non-Final Office Action", U.S. Appl. No. 12/178,268, Dec. 21, 2011, 13 pages.
"Non-Final Office Action", U.S. Appl. No. 13/333,551, Apr. 6, 2012, 5 pages.
"Non-Final Office Action", U.S. Appl. No. 12/636,558, Jan. 10, 2012, 6 pages.
"Non-Final Office Action", U.S. Appl. No. 13/598,282, Oct. 16, 2013, 6 pages.
"Non-Final Office Action", U.S. Appl. No. 12/271,761, Oct. 3, 2011, 6 pages.
"Non-Final Office Action", U.S. Appl. No. 12/101,668, Apr. 5, 2011, 7 pages.
"Non-Final Office Action", U.S. Appl. No. 12/098,254, Jan. 14, 2011, 8 pages.
"Non-Final Office Action", U.S. Appl. No. 12/636,558, May 29, 2012, 8 pages.
"Non-Final Office Action", U.S. Appl. No. 12/101,668, Aug. 9, 2012, 8 pages.
"Non-Final Office Action", U.S. Appl. No. 13/863,079, Oct. 1, 2013, 9 pages.
"Non-Final Office Action", U.S. Appl. No. 12/541,731, Oct. 21, 2011, 9 pages.
"Notice of Allowance", U.S. Appl. No. 12/636,558, Jan. 9, 2013, 4 pages.
"Notice of Allowance", U.S. Appl. No. 12/098,254, Dec. 14, 2011, 4 pages.
"Notice of Allowance", U.S. Appl. No. 13/333,551, May 30, 2012, 4 pages.
"Notice of Allowance", U.S. Appl. No. 12/178,268, Jul. 2, 2012, 4 pages.
"Notice of Allowance", U.S. Appl. No. 12/098,254, Sep. 28, 2011, 4 pages.
"Notice of Allowance", U.S. Appl. No. 12/559,987, Jun. 15, 2012, 5 pages.
"Notice of Allowance", U.S. Appl. No. 12/101,668, Jan. 11, 2013, 6 pages.
"Notice of Allowance", U.S. Appl. No. 12/271,761, Jan. 3, 2012, 6 pages.
"Notice of Allowance", U.S. Appl. No. 12/541,731, Apr. 2, 2013, 8 pages.
"Notice of Allowance", U.S. Appl. No. 13/657,511, Nov. 4, 2013, 9 pages.
"Part 11—Wireless LAN Medium Access Control (MAC) and Physical Layer (PHY) Specifications", Information Technology—

(56) References Cited

OTHER PUBLICATIONS

Telecommunications & Information Exchange Between Systems . . . International Standard, ISO/IEC 8802-11, First Ed., 1999, pp. 1-531.
"PCT Partial Search Report", Application Serial No. PCT/US2008/078343,Partial International Search, Mar. 5, 2009, 2 pages.
"PCT Search Report", Application No. PCT/US2009/056973, Nov. 4, 2009, 13 pages.
"PCT Search Report", Application Serial No. PCT/US2008/078343, May 18, 2009, 5 pages.
"PCT Search Report and Written Opinion", Application No. PCT/US2009/067767, Mar. 26, 2010, 12 pages.
"Restriction Requirement", U.S. Appl. No. 12/101,668, Sep. 22, 2011, 6 pages.
"Supplemental Notice of Allowance", U.S. Appl. No. 13/333,551, Oct. 23, 2012, 2 pages.
"Supplemental Notice of Allowance", U.S. Appl. No. 12/101,668, Feb. 8, 2013, 4 Pages.
"Foreign Notice of Allowance", Japanese Application No. 2011-527899, Jan. 28, 2014, 1 Page.
"Notice of Allowance", U.S. Appl. No. 13/252,416, Sep. 27, 2013, 10 pages.
"Non-Final Office Action", U.S. Appl. No. 12/125,670, Dec. 13, 2011, 11 pages.
"Final Office Action", U.S. Appl. No. 12/125,670, May 24, 2011, 11 pages.
"Non-Final Office Action", U.S. Appl. No. 12/125,670, Jun. 4, 2012, 12 pages.
"Non-Final Office Action", U.S. Appl. No. 13/252,416, Mar. 13, 2013, 16 pages.
"Foreign Office Action", Japanese Application No. 2011-544456, Dec. 3, 2013, 2 pages.
"Non-Final Office Action", U.S. Appl. No. 13/683,056, Nov. 8, 2013, 5 pages.
"Non-Final Office Action", U.S. Appl. No. 12/125,693, Oct. 3, 2011, 7 pages.
"Non-Final Office Action", U.S. Appl. No. 12/125,693, Dec. 20, 2010, 7 pages.
"Notice of Allowance", U.S. Appl. No. 12/125,670, Dec. 11, 2012, 8 pages.
"Foreign Office Action", Chinese Application No. 200980153758.6, Dec. 30, 2013, 8 pages.
"Non-Final Office Action", U.S. Appl. No. 12/125,670, Dec. 7, 2010, 9 pages.
"Final Office Action", U.S. Appl. No. 12/125,693, Jun. 9, 2011, 9 pages.
Anderson, "HDD Based Full Disc Encryption", In Proceedings of THIC Conference 2006, Mar. 2006, 12 pages.
"Foreign Office Action", CN Application No. 200980136849.9, Feb. 7, 2014, 15 Pages.
"Foreign Office Action", CN Application No. 200980136849.9, May 19, 2014, 11 Pages.
"Foreign Decision to Grant", JP Application No. 2011-544456, May 20, 2014, 2 pages.
"Notice of Allowance", U.S. Appl. No. 13/598,282, May 6, 2014, 4 pages.
"Notice of Allowance", U.S. Appl. No. 13/683,056, May 9, 2014, 4 pages.
"Foreign Notice of Allowance", CN Application No. 200980153758.6, Jul. 15, 2014, 4 Pages.
"Non-Final Office Action", U.S. Appl. No. 13/863,079, Aug. 27, 2014, 6 pages.
"Final Office Action", U.S. Appl. No. 13/863,079, May 7, 2014, 7 pages.
"Non-Final Office Action", U.S. Appl. No. 14/205,196, Feb. 5, 2016, 14 pages.
"Final Office Action", U.S. Appl. No. 13/863,079, Jan. 15, 2015, 7 pages.
"Non-Final Office Action", U.S. Appl. No. 13/863,079, Apr. 9, 2015, 7 pages.
"Non-Final Office Action", U.S. Appl. No. 13/874,201, Jun. 5, 2015, 10 pages.
"Board Opinion", CN Application No. 200980136849.9, Aug. 28, 2015, 18 Pages.
"Notice of Allowance", U.S. Appp. No. 13/874,201, Sep. 25, 2015, 6 pages.
"Foreign Office Action", KR Application No. 10-2011-7008700, Jun. 16, 2015, 13 Pages.
"Advisory Action", U.S. Appl. No. 13/804,425, Dec. 26, 2014, 3 pages.
"Amendment 3: Enhancements for Very High Throughput in the 50 GHz Band", Sponsor IEEE 802.11 Committee of the IEEE Computer Society, IEEE P802.11ad/D5.0 (Draft Amendment Based on IEEE P802.11REVmb D10.0) (Amendment to IEEE 802.11REVmb D10.0 as amended by IEEE 802.11ae D5.0 and IEEE 802.11aa 06.0); Draft Standard for Information Technology Telecommunications and Information Exchange, Sep. 2011, 601 pages.
"Amendment 3: Enhancements for Very High Throughput in the 60 GHz Band", IEEE Standard for Information technology; Telecommunications and information exchange between systems; Local and metropolitan area networks; Specific requirements; Part 11: Wireless LAN Medium Access Control (MAC) and Physical Layer (PHY) Specifications, Jul. 2012, 628 pages.
"Amendment 4: Enhancements for Very High Throughput for Operation in Bands below 6 GHz", IEEE Standard for Information technology; Telecommunications and information exchange between systems; Local and metropolitan area networks; Specific requirements; Part 11: Wireless LAN Medium Access Control (MAC) and Physical Layer (PHY) Specifications, Sep. 2011, 425 pages.
"Amendment 4: TV White Spaces Operation", The Institute of Electrical and Electronics Engineers, Inc., IEEE Std P802.11af/D1.05 Draft Standard for Information Technology—Telecommunications and Information Exchange Between Systems—Local and Metropolitan area networks—Specific Requirements, Part 11: Wireless LAN Medium Access Control (MAC) and Physical Layer, Nov. 2011, 123 Pages.
"Amendment 6: Sub 1 GHz License Exempt Operation", 802.11 Working Group of the LAN/MAN Standards Committee of the IEEE Computer Society, IEEE P802.11ah/D1.0 Draft Standard for Information Technology—Telecommunications and Information exchange between systems Local and Metropolitan Area Networks—Specific Requirements Part 11: Wireless LAN Medium Access Control (MAC) and Physical Layer (PH, Oct. 2013, 394 Pages.
"Amendment 8: IEEE 802.11 Wireless Network Management", Prepared by the LAN/MAN Standards Committee of the IEEE Computer Society, Draft Standard for Information technology Telecommunications and information exchange between systems—Local and metropolitan area networks Specific requirements—Part 11: Wireless LAN Medium Access Control (MAC) and Physical Layer (PHY) specifications, Aug. 2010, 426 Pages.
"Corrected Notice of Allowance", U.S. Appl. No. 14/205,196, Apr. 18, 2017, 2 pages.
"Final Office Action", U.S. Appl. No. 13/804,425, Nov. 6, 2015, 9 pages.
"Final Office Action", U.S. Appl. No. 13/804,425, Nov. 21, 2014, 17 pages.
"Final Office Action", U.S. Appl. No. 14/205,196, Aug. 25, 2016, 16 pages.
"IEEE Standard for Information Technology—Telecommunications and Information Exchange between Systems—Local and Metropolitan Area Networks—Specific Requirements", IEEE Std. 802.11-2007, Jun. 12, 2007, 1232 pages.
"IEEE Standard for Information Technology—Telecommunications and Information Exchange between Systems—Local and Metropolitan Area Networks—Specific Requirements", Part 11: Wireless LAN Medium Access Control (MAC) and Physical Layer (PHY) Specifications; IEEE Std. 802.11-2012, Mar. 29, 2012, 2793 pages.
"Information Technology—Telecommunications and Information Exchange Between Systems—Local and Metropolitan Area Net-

(56) References Cited

OTHER PUBLICATIONS works—Specfic Requirements", IEEE, Wireless LAN Medium Access Control (MAC) and Physical Layer (PHY) Specifications, Aug. 20, 1999, 531 pages.
"International Search Report and Written Opinion", PCT Application No. PCT/US2013/031545, Mar. 14, 2015, 11 pages.
"International Search Report and Written Opinion", PCT Application No. PCT/US2014/0211295, Nov. 24, 2014, 16 pages.
"International Search Report and Written Opinion", PCT Application No. PCT/US2014/054885, Dec. 4, 2014, 8 pages.
"International Search Report and Written Opinion", PCT Application PCT/US2012/036236, Jul. 6, 2012, 9 pages.
"Invitation to Pay Additional Fees and Partial International Search Report", PCT Application No. PCT/US2014/021295, Aug. 13, 2014, 5 pages.
"Marketing Requirements Document for Interoperability Testing & Certification of Device Provisioning Protocol", Wi-Fi Alliance Device Provisioning Protocol Marketing Task Group; Version 1.2, 2012, 34 pages.
"Non-Final Office Action", U.S. Appl. No. 13/462,972, May 22, 2013, 10 pages.
"Non-Final Office Action", U.S. Appl. No. 13/804,425, May 4, 2015, 15 pages.
"Non-Final Office Action", U.S. Appl. No. 13/804,425, Jul. 18, 2014, 14 pages.
"Non-Final Office Action", U.S. Appl. No. 14/198,994, Jul. 31, 2015, 12 pages.
"Non-Final Office Action", U.S. Appl. No. 14/482,072, Nov. 19, 2015, 5 pages.
"Notice of Allowance", U.S. Appl. No. 13/804,425, Mar. 21, 2016, 9 pages.
"Notice of Allowance", U.S. Appl. No. 14/198,994, Jan. 29, 2016, 10 pages.
"Notice of Allowance", U.S. Appl. No. 14/205,196, Jan. 3, 2017, 5 pages.
"Notice of Allowance", U.S. Appl. No. 14/482,072, Mar. 22, 2016, 5 pages.
"Notification Concerning Transmittal of International Preliminary Report on Patentability", PCT Application No. PCT/US2014/021295, Sep. 17, 2015, 12 pages.
"Part 16: Air Interface for Broadband Wireless Access Systems", IEEE Standard for Local and Metropolitan Area Networks, May 29, 2009, 2082 pages.
"Public Key Cryptography for the Financial Services Industry: Elliptic Curve Key Agreement and Key Transport Schemes", Working Draft; Version 2.0, Jul. 5, 1998, 125 pages.
"Specification of the Bluetooth System, Version 2.0: vol. 0", Master Table of Contents & Compliance Requirements; pp. 1-74; vol. 1, "Architecture & Terminology Overview", pp. 1-92; vol. 2, "Core System Package [Controller Volume]", pp. 1-814; vol. 4, "Core System Package [Host Volume]"; pp. 1-250, Nov. 4, 2004, 1230 pages.
"Specification Requirements Document (SRD) for Devise Provisioning Protocol", Wi-Fi Alliance Device Provisioning Protocol Marketing Task Group; Version 1.1, 2013, 13 pages.
"Wi-Fi Peer-to-Peer (P2P) Technical Specification", Wi-Fi Alliance Technical Committee P2P Task Group; Draft Version 1.14, Jun. 25, 2010, 154 pages.
"Wi-Fi Peer-to-Peer (P2P) Technical Specification", WiFi Alliance; Version 1.5, 2014, 183 pages.
Chen,"Home Network Basis: Transmission Environments and Wired/Wireless Protocols", Prentice Hall, Jul. 2003, 19 pages.
Cooper,"Internet X.509 Public Key Infrastructure Certificate and Certificate Revocation List (SRL) Profile", Network Working Group; RFC 5280, May 2008, 152 pages.
Harada,"Project: IEEE P802.15 Working Group for Wireless Personal Area Network (WPANs)", IEEE 802.15/07/0693-003c; Slides 24-33 as provided in U.S. Appl. 14/198,994 in an IDS submission filed Feb. 24, 2015, May 2007, 10 pages.
Harkins,"Synthetic Initialization Vecor (SIV) Authenticated Encryption Using the Advanced Encryption Standard (AES)", Network Working Group; RFC 5297; Aruba Networks, Oct. 2008, 27 pages.
Hiertz,"The IEEE 802.11 Universe", IEEE Standards in Communications and Networking; IEEE Communications Magazine, Jan. 2010, 9 pages.
Krawczyk,"HMAC-based Extract-and-Expand Key Derivation Function (HKDF)", Internet Engineering Task Forct (IETF); RFC 5869, May 2010, 15 pages.
McGrew,"Fundamental Elliptic Curve Cryptography Algorithms", Internet Engineering Task Force (IETF); RFC 6090; Fundamental Elliptic Cryptography Algorithms, Feb. 2011, 35 pages.
Perahia,"Gigabit Wireless LANs: an overview of IEEE 802.11ac and 802.11ad", ACM SIGMOBILE Mobile Computing and Communications Review; vol. 15, No. 3, 11 pages, pp. 23-33.
Robinson,"Wi-Fi Simple Configuration Protocol and Usability Best Practices for the Wi-Fi Protected Setup Program", Wi-Fi Alliance; Version 2.0.1, Apr. 2011, 30 pages.
Van Beijnum "Crypto Based Host Identifiers", Internet Draft; draft-van-beijnum-multi6-cbhi-00.K ISSN: 0000-0004; XP15036389A, Jan. 1, 2004, 9 pages.

* cited by examiner

EFFICIENT KEY ESTABLISHMENT FOR WIRELESS NETWORKS

RELATED APPLICATIONS

This application is a continuation of and claims priority to U.S. Utility application Ser. No. 12/541,731, filed Aug. 14, 2009, now U.S. Pat. No. 8,510,560 issued on Aug. 13, 2013, which claims priority to U.S. Provisional Patent Application Ser. No. 61/090,376 filed Aug. 20, 2008 and U.S. Provisional Patent Application Ser. No. 61/090,380 filed Aug. 20, 2008, the disclosures of which are incorporated by reference herein in their entirety.

BACKGROUND

Aspects of the present invention relate generally to the field of network security, and more particularly to the exchange of keys between stations in a wireless network.

In wireless local area networks (LANs), link layer security protocols may be based on the IEEE 802.11 specifications. Early security models such as Wired Equivalent Privacy (WEP), Temporal Key Integrity Protocol (TKIP) and Wi-Fi Protected Access (WPA) that were typically used to protect data sent between stations in a wireless network have been replaced with WPA2. The WPA2 protocol uses an Advanced Encryption Standard (AES) cipher with Counter Mode with Cipher Block Chaining Message Authentication Code Protocol (CCMP). WPA2 uses a four-way handshake to exchange unique nonce (number used once) pairs and establish a unique pairwise key for each pair of communicating stations.

A wireless LAN may utilize a variety of architectures. For example, a wireless LAN can be organized in a star topology with a central access point station communicating with several client stations. Each client station communicates directly only with the access point. Stations can be connected to a network via a network adapter or network interface card that manages the network communications and can provide a MAC address for the station. Alternatively, a wireless LAN can be organized with a basic service set (BSS). In a BSS topology, all the client stations communicate directly with each other. An independent BSS allows communication without use of an access point. Peer-to-peer networks or ad-hoc networks may be independent BSS networks. An infrastructure BSS allows communication between client stations on the BSS network and client stations not on the BSS network via an access point.

Independent Basic Service Set (IBSS) networks, mesh networks, and direct link setup networks in accordance with the IEEE 802.11z standard, may each use a WPA2 protocol to protect inter-station communications. The WPA2 security protocol used in an IBSS may be complicated by the need for unique key/nonce pairs for each pair of communicating stations. A smesh network is an 802.11 multi-hop wireless network that uses a fast handoff scheme to enable client devices to roam in the network within interruption in connectivity. In such systems, where there may not be a central access point responsible for managing communication and security among the nodes of the network, secure communication requires that each station exchange a pair of keys with every other station with which the station communicates.

SUMMARY

A method and apparatus are provided for deriving an encryption key for use between two stations in a wireless network using information intrinsic to one of the stations, without exchanging pairwise transient keys. In some embodiments, the intrinsic information may be information provided in a beacon signal transmitted by one of the stations. In some embodiments, the intrinsic information may include the media access control (MAC) addresses of the stations. In some embodiments, infinite error detection may be used to verify the integrity of messages exchanged between the stations.

BRIEF DESCRIPTION OF THE DRAWINGS

The present invention is described herein with reference to the accompanying drawings, in which similar reference numbers are used to indicate functionally similar elements. The foregoing and other aspects of various embodiments of the present invention will be apparent through examination of the following detailed description thereof in conjunction with the accompanying drawing figures in which similar reference numbers are used to indicate functionally similar elements.

DETAILED DESCRIPTION

Figure 1:
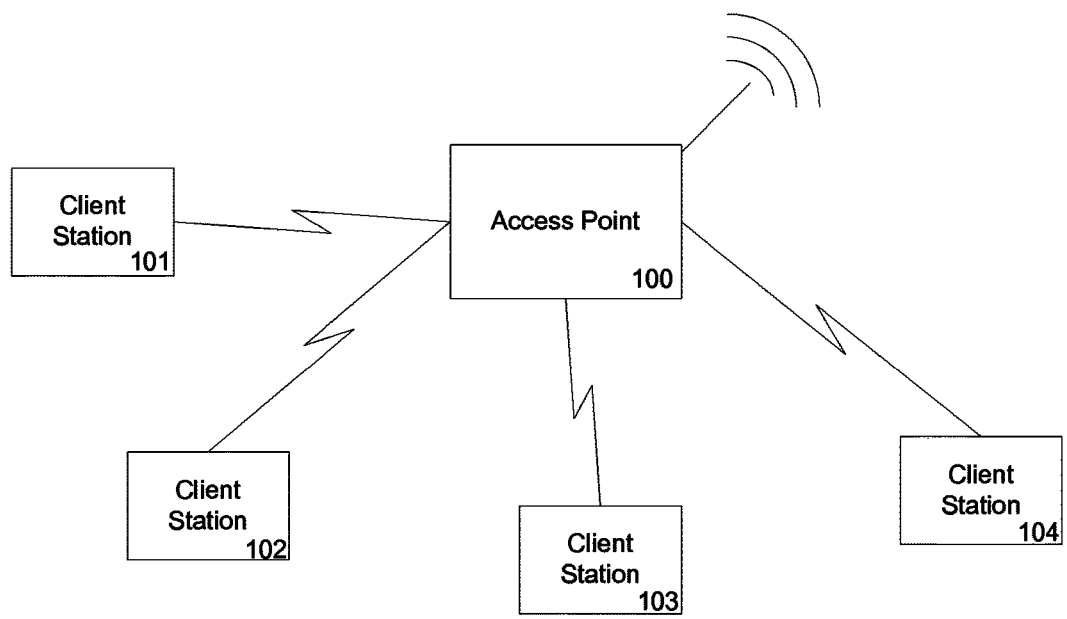
FIG. 1 shows a conventional star topology for a wireless network.

FIG. 1 shows a conventional star topology for a wireless network. Each client station 101-104 communicates with access point 100. Access point 100 functions as a gateway for a client station to a local area network (LAN) or to the Internet. Additionally, if client station 101 communicates with client station 102, the communication would be facilitated via access point 100. Once client station 101 begins communicating with access point 100, access point 100 initiates an authentication protocol to verify the identity of the access point to the client station. For example a variation of Extensible Authentication Protocol (EAP) can be used, which includes the exchange of a Pairwise Master Key (PMK). The PMK is unique for each access point/client station pair, but may be communicated sparingly in order to preserve the secrecy of the PMK.

To initiate secure communication between access point 100 and client station 101, additional security may be provided at the link layer and may involve the exchange of secure Pairwise Transient Keys (PTKs). AES-CCMP is an example of an encryption protocol used to exchange PTKs. The keys exchanged between access point 100 and client station 101 should be unique from the keys exchanged with client station 102. Therefore, access point 100 may exchange different keys with each client station.

Figure 3:
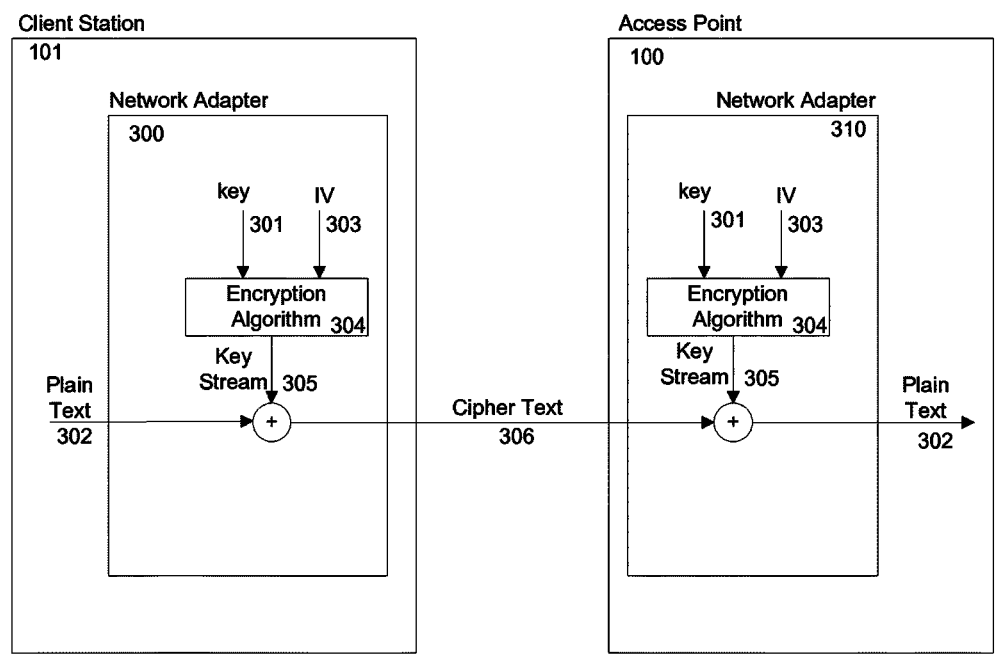
FIG. 3 shows a conventional exchange of encrypted data between an access point and a client station.

FIG. 3 shows a conventional exchange of encrypted data between two network adapters. Each station capable of communicating in a wireless network may implement a network adapter. A network adapter manages the network connection, provides a MAC address for the station, and implements an encryption algorithm to facilitate secure communications. As shown in FIG. 3, client station 101 includes a network adapter 300, and access point 100 includes a network adapter 310. Once the PTK has been established, data may be exchanged between network adapter 300 and network adapter 310. Network adapter 300 combines key 301 and initialization vector 303 with encryption algorithm 304, the output of such combination is key stream 305. Key stream 305 is XOR'd with plain text data 302 to create cipher text 306. Cipher text 306 is an encrypted message that may safely be sent to network adapter 310. Network adapter 310 similarly uses key 301, initialization vector 303, and encryption algorithm 304 to create key stream 305. Key stream 305 is then XOR'd with cipher text 306 to derive plain text data 302.

Key 301 may be the PTK established during the four-way handshake. Initialization vector 303 may be a unique value for each packet of data sent from network adapter 300 to network adapter 310. A unique initialization vector 303 for every packet ensures that key stream 305 is unique for every packet sent. If key stream 305 never varied, key stream 305 may be deciphered by intercepting multiple packets with similar plain text data. To accommodate a unique initialization vector, nonce values may be exchanged between stations.

Figure 2:
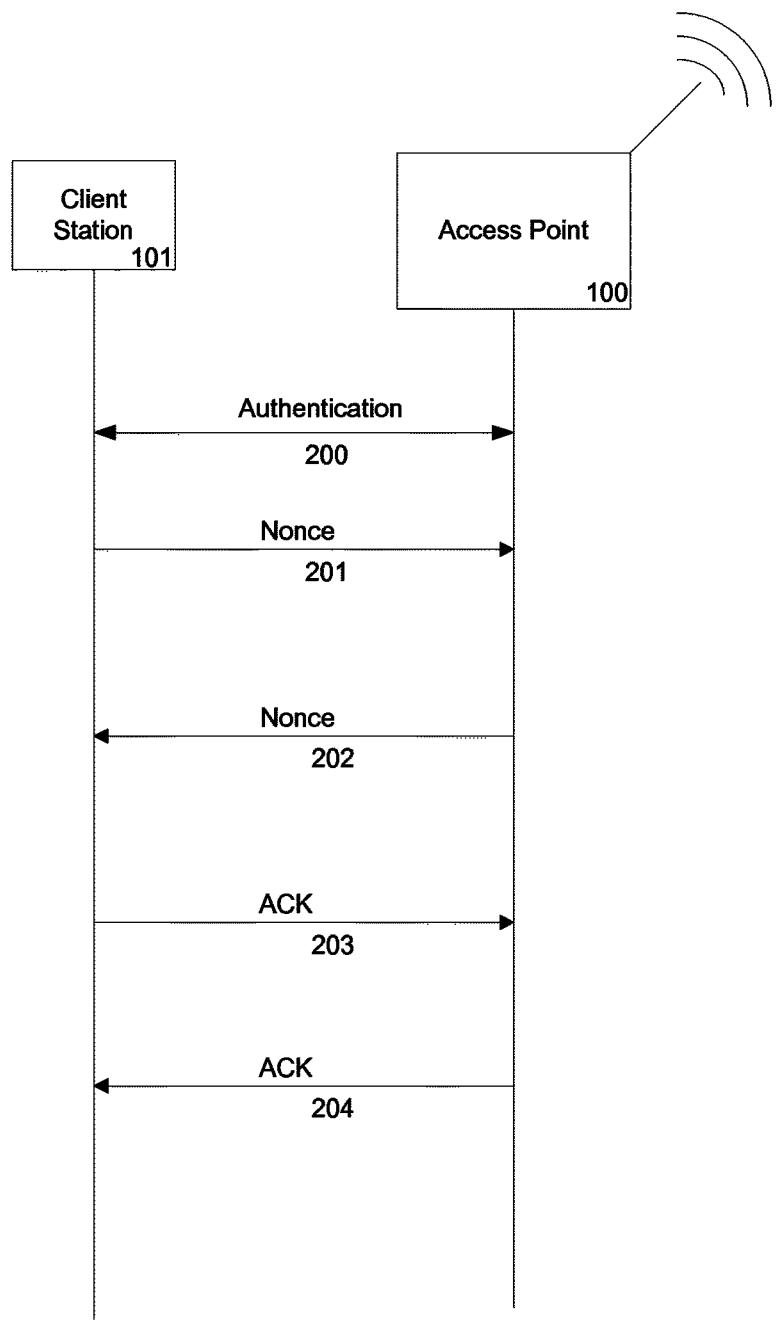
FIG. 2 shows a conventional key exchange using a four-way handshake between an access point and a client station.

FIG. 2 shows a conventional key exchange using a four-way handshake between access point 100 and client station 101. As previously noted, upon joining the network, client station 101 and access point 100 may engage in an authentication exchange 200 to authenticate the identity of client station 101. Then the four-way handshake may begin. Number used once (nonce) 201 and nonce 202 are exchanged. Once utilized, nonce 201 and nonce 202 may not be used in another four-way handshake by either station. Acknowledgment messages ACK 203 and ACK 204 are then exchanged. The four-way handshake exchange may occur between each pair of communicating stations in the network to ensure that an encryption key is unique for each client station/access point pair.

A Pairwise Transient Key (PTK) may be derived using the earlier exchanged PMK, nonce 201, nonce 202, and the Media Access Control (MAC) addresses of communicating stations. Acknowledgement messages may additionally include a Group Temporal Key (GTK), which is a sequence number for use with the relay of broadcast messages, and a message integrity check (MIC) value. A MIC can be used to verify the integrity of the message and may additionally be exchanged with the nonce values. In some implementations, MIC is computed or derived from a hash function, for instance. If both client station 101 and access point station 100 calculate a MIC value, any discrepancy between the two calculated values can indicate that the message has been tampered with or has otherwise been altered. A GTK is a key that can be used by a broadcasting station to validate each broadcast transmission.

Figure 4:
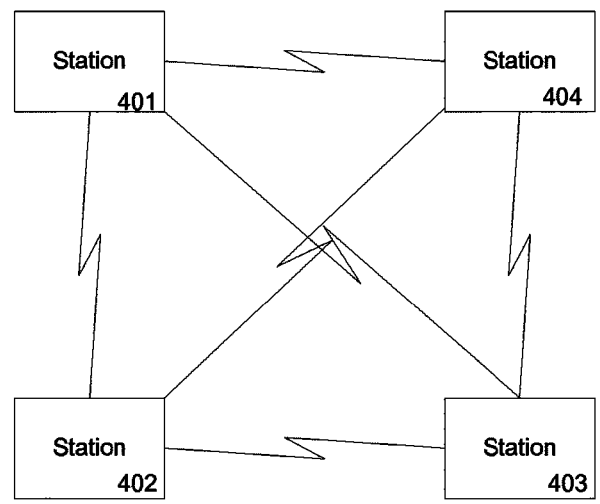
FIG. 4 shows one embodiment of a fully connected mesh network topology.

FIG. 4 shows one embodiment of a mesh network topology. A mesh network can be any ad hoc network in which the stations communicate directly with other stations without an access point managing the communications. In a fully connected mesh network, a station may be connected to every other station in the network, and any station may be connected to a LAN or to the Internet. As shown in FIG. 4, station 401 communicates directly with station 402, station 403, and station 404. Using traditional security protocols, in order to maintain secure communications, station 401 would need to exchange unique keys with every other station with which station 401 communicates, e.g., with station 402, 403, and 404. Then station 402 would need to exchange unique keys with every other station with which it communicates. If there are N stations in the network, the key exchange involves N*(N−1) exchanges, each exchange involving a four-way handshake. This exchange of unique keys may result in substantial overhead.

Figure 5:
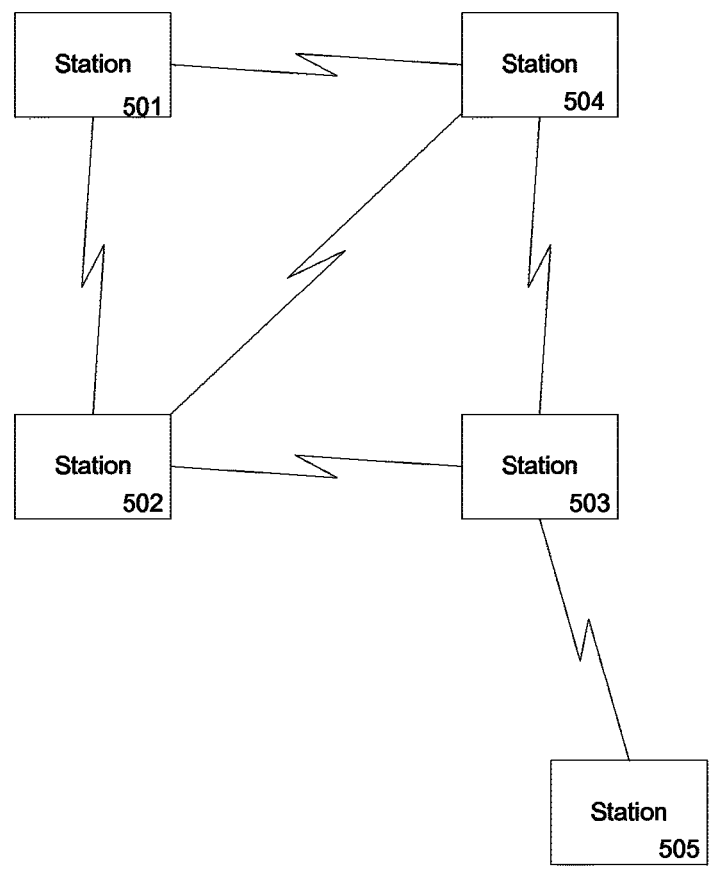
FIG. 5 shows one embodiment of an ad hoc mesh network that is not fully connected.

FIG. 5 shows one embodiment of an ad hoc mesh network that is not fully connected. Station 501 communicates directly with station 502 and station 504, but not station 503. Station 505 communicates directly with only station 503. As shown, the stations in the network are not able to communicate directly with every other station in the network, but are capable of indirect communication via one or more additional stations. For example, communication between station 501 and station 505 may be relayed through station 503 and station 504. Each station then only needs to exchange encryption keys with those stations in the network with which direct communication is possible. Station 503 can exchange encryption keys with station 502, station 504 and station 505, but not station 501. Although less than N*(N−1) exchanges are needed to facilitate secure communication in the network, each key exchange still involves a four-way handshake, resulting in substantial overhead. An independent BSS network or a direct link setup network may also be organized using a mesh network topology.

In a mesh network involving broadcast or multicast of messages, significant difficulties arise over the exchange of unique keys. Each broadcasting station may have a unique GTK that may be exchanged with every station capable of receiving a broadcast message. A station added to an ad hoc network may not be able to receive broadcast messages until it has exchanged a GTK with the broadcasting station. The GTK may change with every addition or removal of a station in the mesh network, which may require an update of the GTK at every station in the network, each update involving a handshake between communicating stations. The exchange and update of the GTK therefore may involve substantial overhead.

Encrypting data without the explicit exchange of unique keys eliminates some of the overhead inherent in the unique key exchange between stations in a mesh network. Additionally, allowing stations to receive broadcast messages without first requiring an explicit exchange of keys can decrease overhead time by allowing more efficient broadcast communication. To maintain security without an explicit exchange of information, data can be encrypted using keys derived from intrinsic information known within the stations.

In one embodiment, a station communicates with other stations in the network via a network adapter or network interface card. The network adapter comprises an encryption module. The encryption module can be implemented in hardware, such as memory registers, buffers, or other memory structures, or in software or other hardware executable instructions. The encryption module has access to information intrinsic to the station. Intrinsic information can be any information known within the station, or obtainable by the station, that is not obtained with the traditional four-way handshake.

In one embodiment, intrinsic information used to derive an encryption key includes information included in a beacon message. A beacon message is a packet that is typically sent to alert stations in an ad hoc network that a new station has been added to the network. Information for portions of a unique key to secure communications with the station that transmitted the beacon can be derived from information included in the beacon.

In one embodiment, a unique key is established between station 501 and station 502 using the standard four-way handshake, then implicit knowledge of additional devices communicating with station 501, for example station 504, is used to establish a unique key between station 502 and station 504. The derivation of a key based on prior communications between stations can be facilitated with the use of the implicit knowledge within station 501 of the MAC addresses of the stations with which station 501 communicates.

In one embodiment, key derivation and exchange is simplified. For example, a unique key is established with the exchange of a single nonce value, rather than two separate nonce values. The data packet exchanged between stations containing the nonce value includes additional sequence space in the packet header. The sequence space may be used in combination with the single nonce value to calculate a unique key.

In one embodiment, the use of an infinite error extension mode eliminates the need for unique key pairs. Infinite error extension used to derive a MIC value included in the encrypted transmission allows for secure communication and authentication without the use of unique pairs, as any error in the message will be known.

Figure 6:
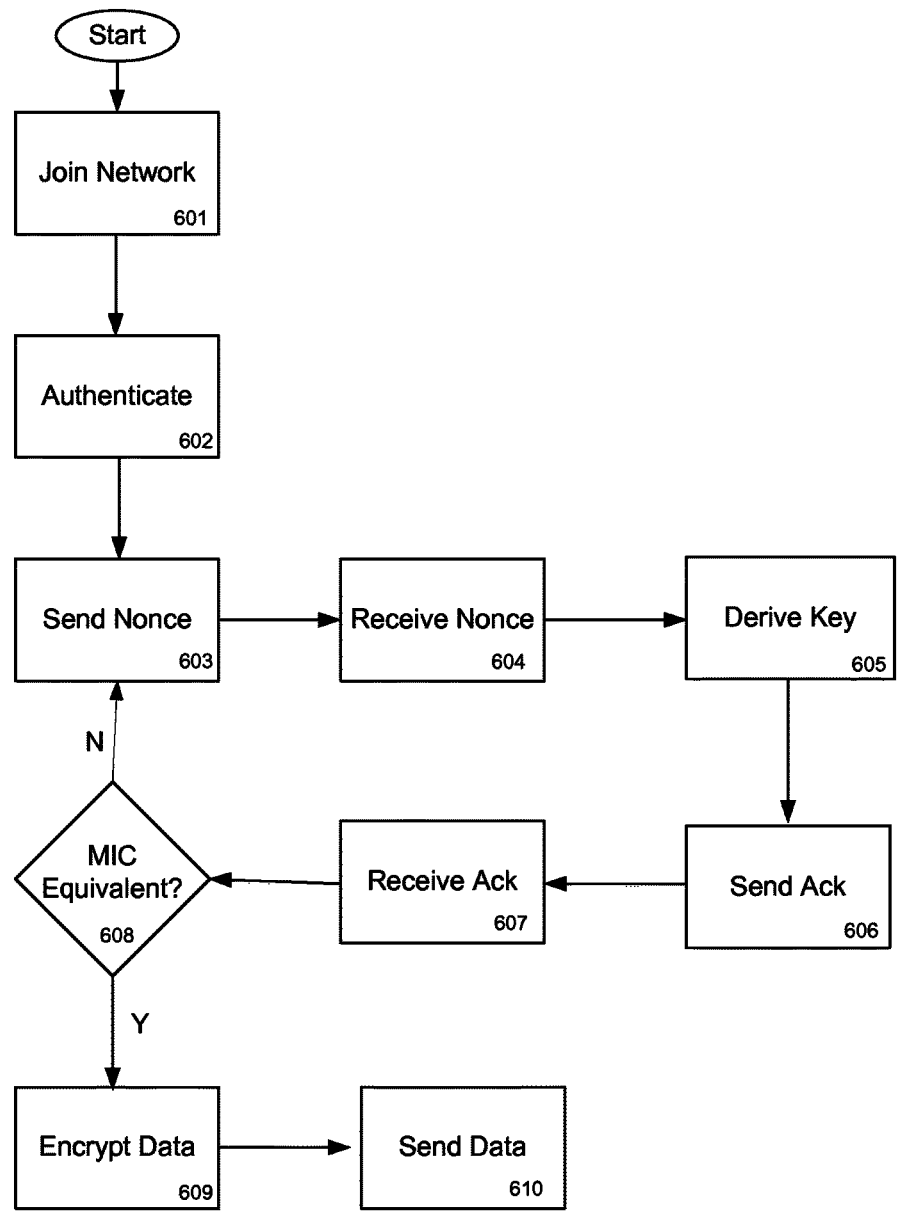
FIG. 6 is a simplified flow diagram illustrating general operation of a traditional method of exchanging secure keys and communicating encrypted data in a wireless network.

FIG. 6 is a simplified flow diagram illustrating general operation of a traditional method of exchanging secure keys and communicating encrypted data in a wireless network. With reference also to FIG. 2, it will be appreciated that aspects of the method illustrated in FIG. 6 may generally be conducted by one or more components of client station 101 depicted at the left of FIG. 2. The exchange of encryption keys to facilitate secure communication of data can begin when a station (such as station 101) joins a wireless network at block 601. Upon joining the network, an authentication protocol is initiated at block 602 to verify the identity of the station. A nonce value is sent at block 603. The nonce value can be used as a first unique initialization vector with the encryption key and an encryption algorithm to protect data confidentiality. At block 604 a second nonce value is received. A key is derived at block 605 using both nonce values. An acknowledgment message is sent at block 606; the acknowledgement message comprises a message integrity check value. An acknowledgment message is received at block 607. If the received acknowledgment message contains a message integrity check, and a message integrity check calculated with the second acknowledgment message are not equivalent at decision block 608, then an error may have occurred during the transmission of nonce values or acknowledgement messages, and the exchange may be again attempted. If at decision block 608 the received and calculated message integrity check values are equivalent, the pairwise transient keys have been successfully exchanged and transmission data can be effectively encrypted at block 609. An exchange of data then occurs at block 610.

Figure 7:
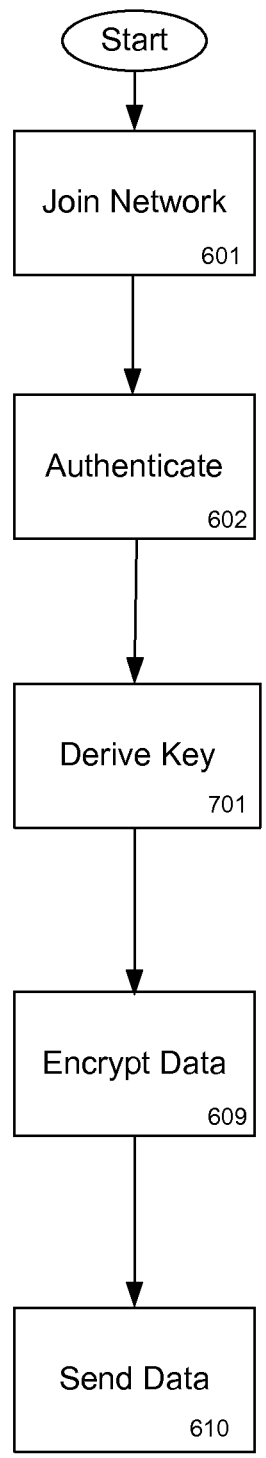
FIG. 7 is a simplified flow diagram illustrating general operation of one embodiment of a method of establishing secure keys with intrinsic information and exchanging encrypted data in a wireless network.

FIG. 7 is a simplified flow diagram illustrating general operation of one embodiment of a method of establishing secure keys with intrinsic information and exchanging encrypted data in a wireless network. The exchange of encryption keys to facilitate secure communication of data may be unnecessary when intrinsic information is used to derive an encryption key. The derivation of an encryption key can be initiated when a station joins a wireless network at block 601. Upon joining the network, an authentication protocol is initiated at block 602 to verify the identity of the new station. To initiate communication with the new station, a network station first derives an encryption key. The key is derived at block 701 using information already known in, or intrinsic to the initiating station. This intrinsic information can be some combination of station MAC addresses, data exchanged during authentication, data contained in a beacon message used to announce the addition of the new station to the network, etc. If both the receiving and communicating stations have access to the intrinsic data, and both stations use the same algorithm to derive the keys, then communication between the stations may be secure. Once an encryption key has been derived, transmission data can be effectively encrypted (at block 609) and an exchange of data can then occur (at block 610) generally as set forth above.

It is noted that the arrangement of the blocks in FIG. 7 does not necessarily imply a particular order or sequence of events, nor is the arrangement intended to exclude other possibilities. For example, the operations depicted at 602 and 701 may occur substantially simultaneously with each other; similarly, the operation occurring at block 602 may be eliminated in some instances.

Although the above embodiments were described primarily as applicable to a mesh network, the embodiments may be effectively utilized in any wireline or wireless network that conventionally uses an exchange of unique key pairs to encrypt secure data, including an IBSS network, an smesh network, a DLS network, or a conventional network based on a star topology with an access point and client stations.

While the invention has been described in detail above with reference to some embodiments, alternative implementations and various modifications are within the scope of the present disclosure. Therefore, the invention should be considered as limited only by the scope of the appended claims.

What is claimed is:

1. A method comprising:
   receiving, at a first network station, a data packet containing intrinsic information corresponding to a second network station joining a wireless network;
   deriving an encryption key using the intrinsic information corresponding to the second network station without a four-way handshake between the first and second network stations, the encryption key usable to encrypt data to be communicated between the first and second network stations through secure communication;
   encrypting data using the encryption key; and
   communicating, through the secure connection, the encrypted data to the second network station.

2. The method of claim 1, wherein the encrypted data is communicated to the second network station without exchanging pairwise transient keys with the second network station.

3. The method of claim 1, wherein the data packet comprises a beacon signal.

4. The method of claim 1, wherein the intrinsic information comprises a media access control (MAC) address of the second network station.

5. The method of claim 1, wherein the wireless network does not include a central access point.

6. The method of claim 1, wherein the wireless network comprises a mesh network.

7. The method of claim 1, wherein the wireless network comprises one of an independent basic service set (IBSS) network, a smesh network, or a distributed link software (DLS) network.

8. A first network station in a wireless network, the first network station configured to receive a beacon signal when a second network station joins the wireless network, the first network station comprising:

at least a memory and a processor to implement a network adaptor, the network adapter configured to:

extract information intrinsic to the second network station from the beacon signal;

derive an encryption key using the information intrinsic to the second network station without a four-way handshake between the first and second network stations, the encryption key usable to encrypt data to be communicated between the first and second network stations through secure communication; and encrypt data for communication to the second network station using the encryption key.

9. The first network station of claim 8, wherein the information intrinsic to the second network station comprises a media access control (MAC) address of the second network station.

10. The first network station of claim 8, wherein the first network station is further configured to communicate the encrypted data to the second network station without exchanging pairwise transient keys with the second network station.

11. The first network station of claim 8, wherein the wireless network does not include a central access point.

12. The first network station of claim 8, wherein the wireless network comprises a mesh network.

13. The first network station of claim 8, wherein the wireless network comprises one of an independent basic service set (IBSS) network, a smesh network, or a distributed link software (DLS) network.

14. A method comprising:

establishing, at a first network station, a first unique key with a second network station;

receiving information corresponding to a third network station from the second network station;

deriving a second unique key using the information corresponding to the third network station without a four-way handshake, the second unique key usable to encrypt data to be communicated between the first and third network stations through secure communication;

encrypting data using the second unique key; and communicating, through the secure communication, the encrypted data to the third network station.

15. The method of claim 14, wherein the information corresponding to the third network station was derived by the second network station based on prior communications between the second network station and the third network station.

16. The method of claim 14, wherein the information corresponding to the third network station comprises a media access control (MAC) address of the third network station.

17. The method of claim 14, wherein the first unique key is established using a four-way handshake.

18. The method of claim 14, wherein the encrypted data is communicated to the third network station without a prior exchange of pairwise transient keys between the first network station and the third network station.

19. The method of claim 14, wherein the wireless network comprises a mesh network.

20. The method of claim 14, wherein the wireless network comprises one of an independent basic service set (IBSS) network, a smesh network, or a distributed link software (DLS) network.

* * * * *